United States Patent [19]

Nakamura

[11] Patent Number: 4,844,027
[45] Date of Patent: Jul. 4, 1989

[54] SYSTEM FOR CONTROLLING THE IGNITION TIMING OF AN INTERNAL COMBUSTION ENGINE

[75] Inventor: Mitsuo Nakamura, Tokyo, Japan

[73] Assignee: Fuji Jukogyo Kabushiki Kaisha, Tokyo, Japan

[21] Appl. No.: 203,301

[22] Filed: Jun. 6, 1988

[30] Foreign Application Priority Data

Jun. 8, 1987 [JP] Japan .................. 62-143867

[51] Int. Cl.$^4$ .............................. F02P 5/15
[52] U.S. Cl. .................. 123/425; 364/431.08
[58] Field of Search ............... 123/425, 435; 364/431.08

[56] References Cited

U.S. PATENT DOCUMENTS 4,620,518 11/1986 Nagai ................ 123/425

FOREIGN PATENT DOCUMENTS 61-157771 7/1986 Japan .

Primary Examiner—Andrew M. Dolinar
Attorney, Agent, or Firm—Martin A. Farber

[57] ABSTRACT

A system has a table storing initial timings, a rough correcting section for correcting an initial ignition timing derived from the table with a rough correcting quantity, thereby producing a basic ignition timing, and a fine correcting section for correcting the basic ignition timing with a fine correcting quantity to produce a real ignition timing when the rough correcting quantity becomes a predetermined value. The rough correcting operation is stopped when a predetermined time elapsed during the rough correcting operation, and the fine correcting operation is started.

2 Claims, 5 Drawing Sheets

SYSTEM FOR CONTROLLING THE IGNITION TIMING OF AN INTERNAL COMBUSTION ENGINE

BACKGROUND OF THE INVENTION

The present invention relates to a system for controlling the ignition timing of an internal combustion engine such as an automotive engine.

Japanese Patent Laid Open No. 61-157771 (U.S. Pat. No. 4,620,518) discloses a control system wherein the operation thereof is divided into a rough correction and a fine correction. In the rough correction, a coefficient for correcting a basic ignition timing is obtained so as to approximate the basic ignition timing to a desired ignition timing. In the fine correction, a correcting quantity of the ignition timing is obtained by learning operation in dependence on engine speed and intake air pressure. Thus, the basic ignition timing is further corrected by the correcting quantity. When the correcting quantity in the fine correction exceeds a predetermined limit value, the operation returns to the rough correction, thereby correcting the coefficient to approximate the basic injection timing to the desired timing.

However, the correcting coefficient is corrected only when the motor vehicle is driven under a predetermined driving condition for the rough correction. Therefore, while the vehicle is driven out of the driving condition range, the correcting coefficient cannot be determined so that the rough correction routine is not completed. Accordingly, if a knocking occurs under such a condition, the control system does not operate to prevent the knocking.

Additionally, when the rough correction does not proceed because the vehicle is not driven at a condition for rough correction, for example, at continuous uphill driving, or because the correcting coefficient returns to an initial value owing to disturbances such as noise, the operation does not proceed to the fine correction. Thus, the ignition timing cannot be corrected to stop the knocking.

SUMMARY OF THE INVENTION

The object of the present invention is to provide a control system the operation of which is forcibly caused to proceed to the fine correction routine, when the rough correction routine does not end within a predetermined period, thereby correcting the ignition timing to a desired ignition timing.

According to the present invention, there is provided a system for controlling the ignition timing of an internal combustion engine having an ignition timing control device, the system having a knock sensor for sensing engine knock and for producing a knock signal, sensing means for sensing operating conditions of the engine and for producing an engine operating condition signal, a table storing initial ignition timings, rough correcting means responsive to the knock signal and the engine operating condition signal for correcting an initial ignition timing derived from the table with a rough correcting quantity including a coefficient, thereby producing a basic ignition timing, fine correcting means responsive to the knock signal for correcting the basic ignition timing with a fine correcting quantity to produce a real ignition timing when the rough correcting quantity becomes a predetermined value.

The system comprises first detector means for detecting elapsed time from the start of the rough correcting operation and for producing a first change signal when a predetermined time elapsed during the rough correcting operation, first means responsive to the first change signal for ending the rough correcting operation and starting the fine correcting operation.

In an aspect of the invention, the system further comprises second detector means for detecting the fine correcting quantity and for producing a second change signal when the fine correcting quantity exceeds a predetermined value, and second means responsive to the second change signal for ending the fine correcting operation and for starting the rough correcting operation.

The other objects and features of this invention will become understood from the following description with reference to the accompanying drawings.

DETAILED DESCRIPTION OF THE PREFERRED EMBODIMENT

Figure 1:
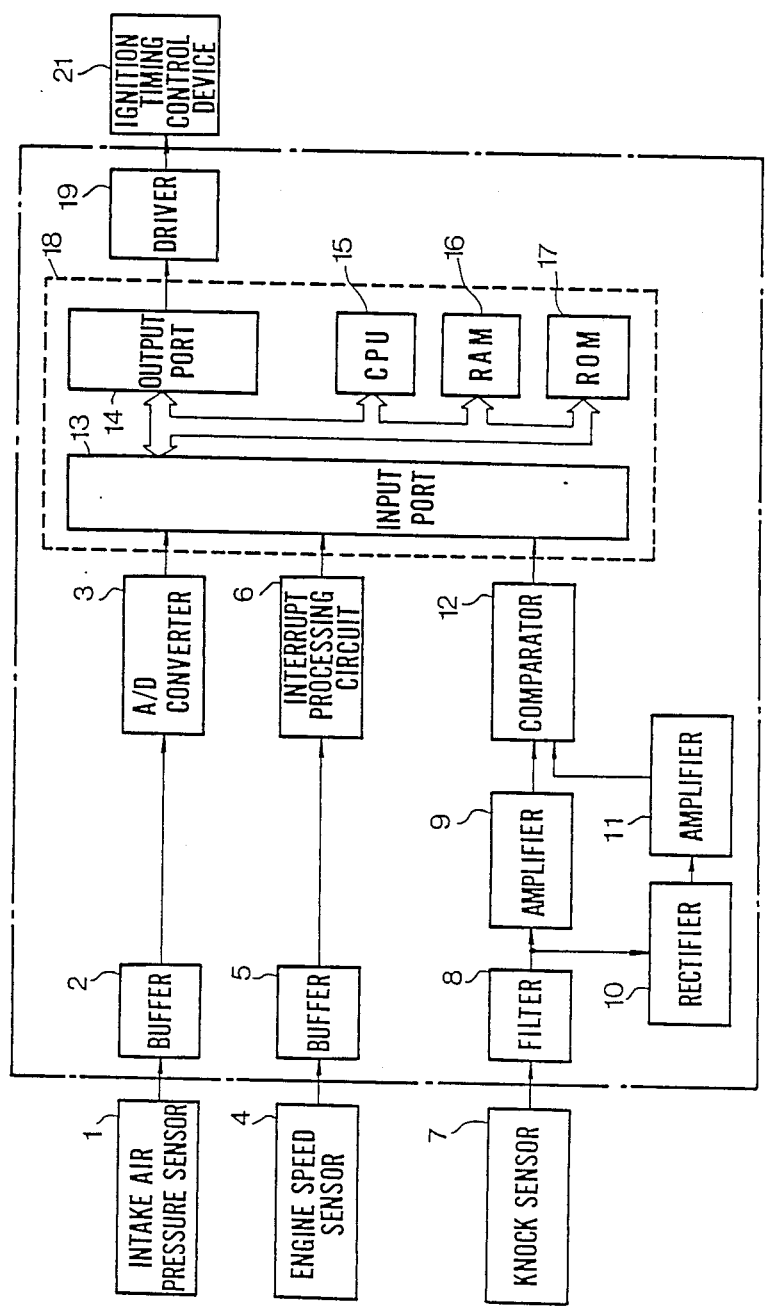
FIG. 1 is a block diagram showing a control system according to the present invention.

Referring to FIG. 1, an intake air pressure (or quantity) sensor 1, engine speed sensor 4 such as a crank angle sensor, and knock sensor 7 are provided to detect engine operating conditions. The output of the sensor 1 is applied to an A/D converter 3 through a buffer 2, and the output of the sensor 4 is applied to an interrupt processing circuit 6 through a buffer 5. The output of the knock sensor 7 is applied to a comparator 12 through a filter 8 and amplifier 9, and, on the other hand, to the comparator 12 through a rectifier 10 and amplifier 11. The comparator 12 compares both inputs and produces an output signal when an engine knock having a higher level than a predetermined value is generated. Outputs of the A/D converter 3, circuit 6 and comparator 12 are applied to a microprocessor 18 through an input port 13.

The microprocessor 18 comprises a CPU 15, RAM 16, ROM 17 and output port 14 connected by a bass line with each other. The output of the microprocessor 18 is applied to an ignition timing control device 21 through a driver 19 so as to control the ignition timing in accordance with the engine operating conditions sensed by the sensors 1, 4 and 7.

Figure 5:
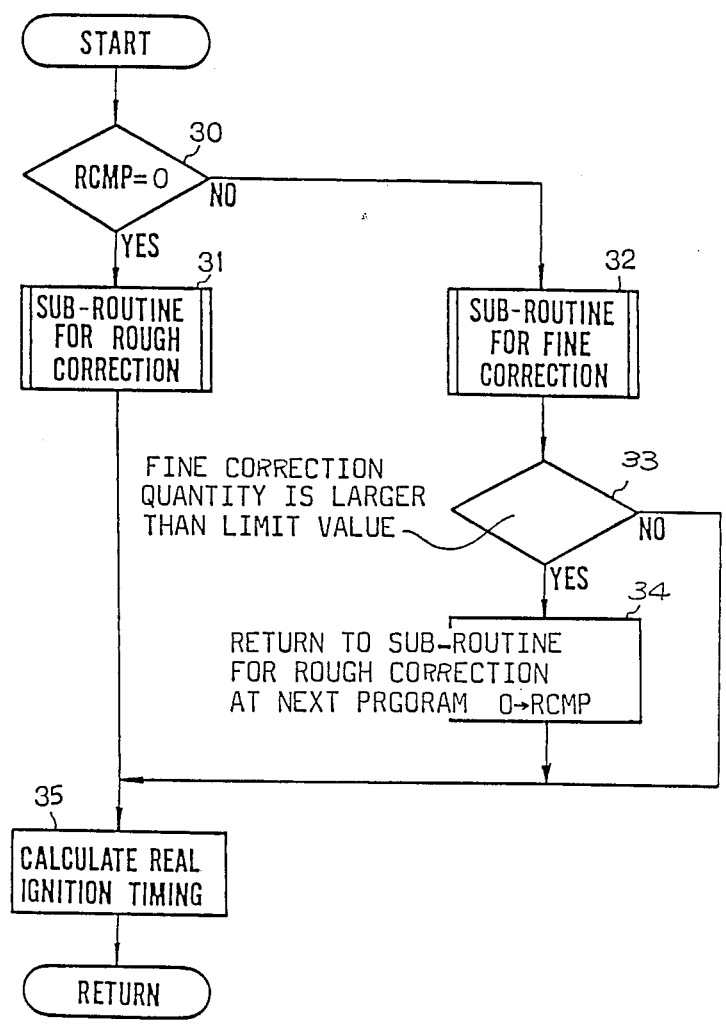
FIGS. 5 and 6 are flow charts showing the operation of the system.

FIG. 5 shows the operation of the control system. The operation is divided into a rough correction and a fine correction. At a step 30, it is determined whether a rough correction has been executed (if a rough correction completion flag RCMP is set). In accordance with the decision, the rough correction or fine correction is executed at a step 31 or 32. After the fine correction is executed, at a step 33, it is determined whether the quantity of fine correction is larger than a limit value. When the quantity is larger, at a step 34, the program returns to the sub-routine for rough correction at the next program. At a step 35, a real ignition timing $SPK_{real}$ is calculated.

Figure 2:
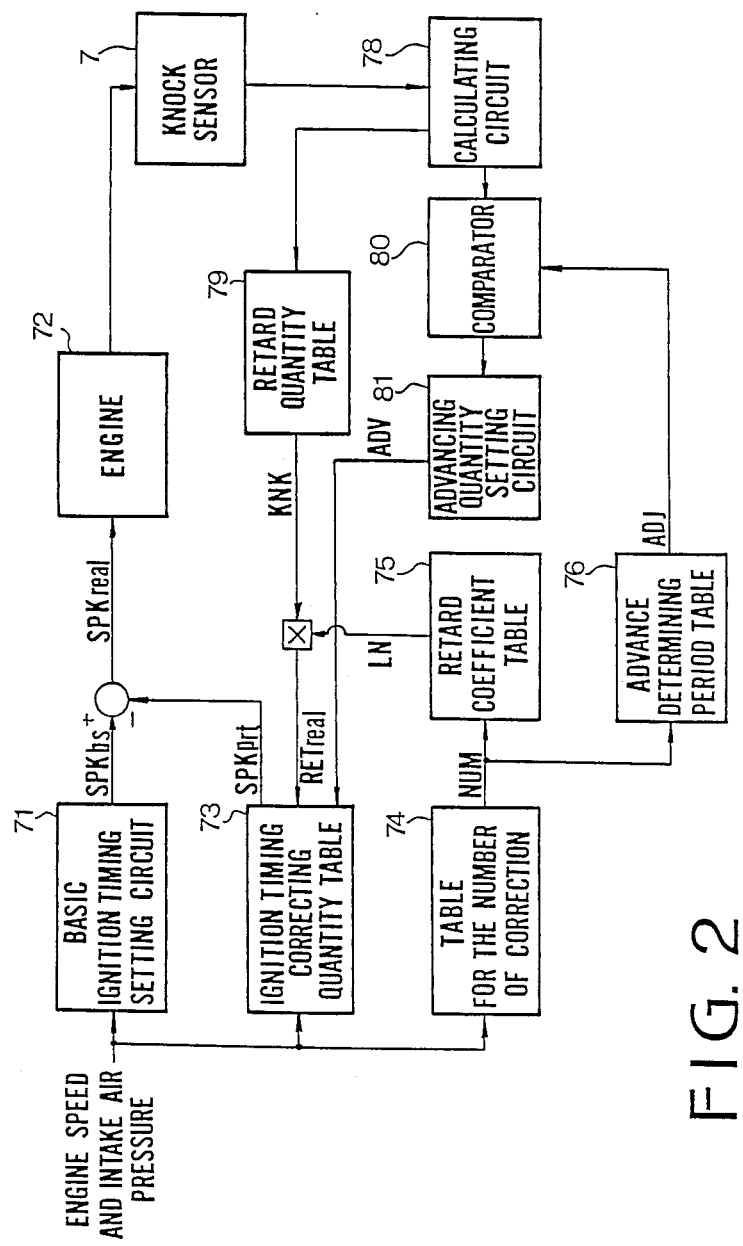
FIG. 2 is a block diagram showing a main part of the control system.
Figure 3A:
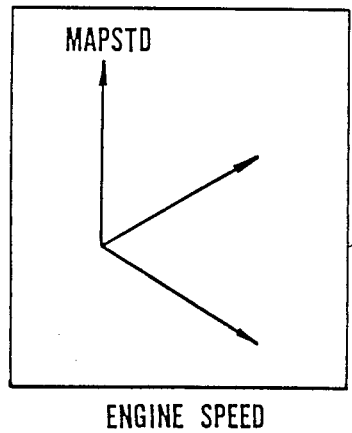
FIGS. 3a and 3b show tables storing a plurality of ignition timings.
Figure 3B:
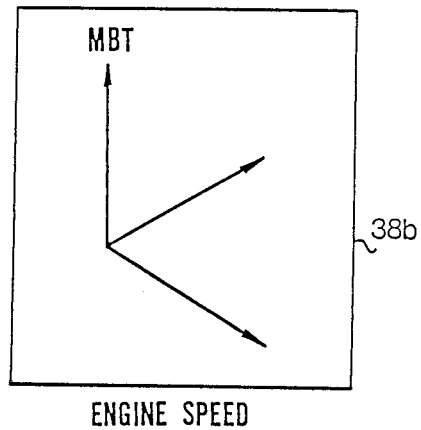
Figure 6:
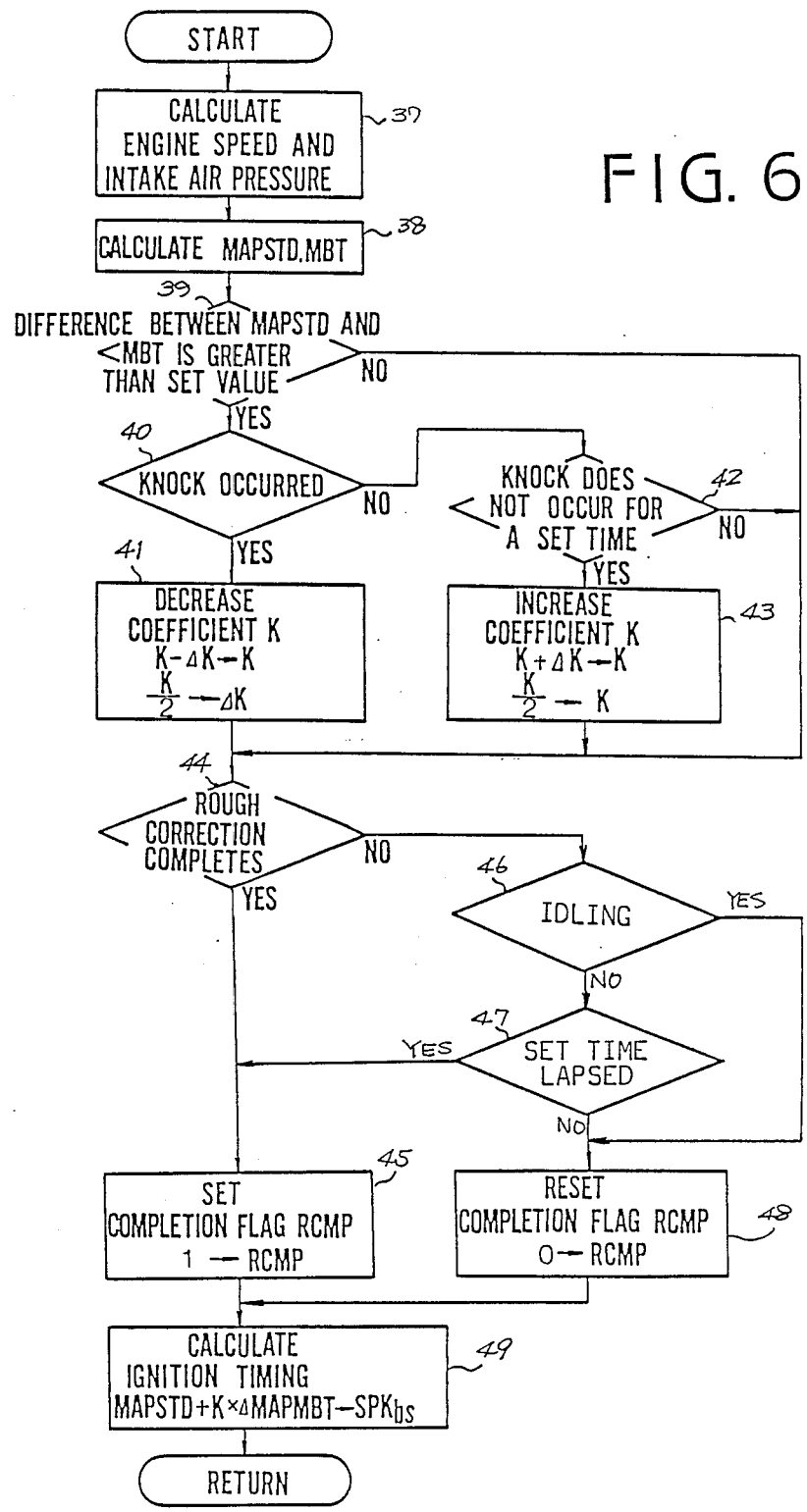

The rough correction is an operation for obtaining a basic ignition timing SPK$_{bs}$ which is calculated in a basic ignition timing setting circuit 71 shown in FIG. 2. FIG. 6 shows the operation of the rough correction. At a step 37, engine speed and intake air pressure are calculated based on output signals of sensors 1 and 4. Thereafter, at a step 38, a first maximum ignition timing MAPSTD as an initial ignition timing and a second maximum ignition timing MBT are read from tables 38a and 38b (FIGS. 3a, 3b) in the ROM 17, in accordance with the engine speed and intake air pressure. The first maximum ignition timing is maximum timing for producing maximum torque with low-octane gasoline without the occurrence of knocking and the second maximum ignition timing is maximum timing for producing maximum torque with high-octane gasoline without occurrence of the knocking.

Figure 4:
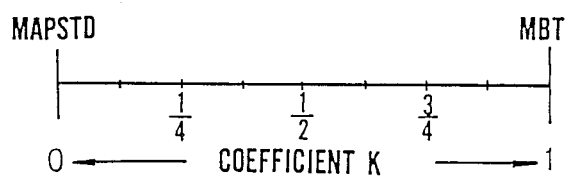
FIG. 4 shows a range of a coefficient K.

In the system, a coefficient K for correcting the ignition timing is provided. The value of the coefficient K is preliminarily set to a value between zero and 1 as shown in FIG. 4.

The coefficient K is stored in the RAM 16 and updated in accordance with engine operating conditions so as to roughly converge the ignition timing to a desired ignition timing. The updating is performed under a predetermined condition and the condition is determined at a step 39. When the difference between the first and second maximum ignition timings read from the tables 38a and 38b (FIG. 3a and FIG. 3b) is larger than a predetermined degree, for example 5°, the updating is performed. Namely, the program proceeds to a step 40, where it is determined whether a knock has occurred during the program. When the occurrence of knocking is determined, the program proceeds to a step 41, and if not, proceeds to a step 42. At step 41, the coefficient K is decremented by a correcting auantity $\Delta K (\Delta K = K/2)$, and the remainder $K - \Delta K$ is stored in the RAM 16 as a new coefficient for the next updating. Accordingly, the correcting quantity $\Delta K$ at the next updating is $(K - \Delta K)/2$. Namely, the correcting quantity is one-half of the coefficient K at updating. More particularly, if the initial coefficient is $\frac{1}{2}$, the correcting quantity is $\frac{1}{4}$, and if it is 0 or 1, the correcting quantity is $\frac{1}{2}$ as seen from FIG. 4.

At the step 42, it is determined whether the engine has operated without knock occurring for a predetermined period. When knocking does not occur for the period, the coefficient K is incremented by the correcting quantity $\Delta K$ at a step 43.

After the updating of the coefficient K at step 41 or 43, it is determined whether the rough correction is completed at a step 44. As will be understood from the above description, the correcting quantity $\Delta K$ decreases as the number of the correction increases. In the system, when the correcting quantity reaches a predetermined small value, the rough correction is completed. Accordingly, if quantity $\Delta K$ reaches the predetermined value, a rough correction completion flag RCMP is set at a step 45.

When the quantity $\Delta K$ is larger than the predetermined value, that is when the rough correction is not completed, the program proceeds to a step 46 where it is determined whether the engine speed is higher than an idling speed. When it is determined that the engine is not idling, the program proceeds to a step 47. At the step 47, it is determined whether a set time has lapsed since the program entered the rough correction subroutine. If the predetermined time has lapsed, the program proceeds to the step 45 thereby determining the completion of the rough correction. If the engine is idling or the predetermined time does not lapse, the flag is reset at a step 48. On the other hand, the total correcting quantity SPK$_{prt}$ and the number of correction NUM of ignition timing are stored in an ignition timing correcting quantity table 73 and a table 74 (FIG. 2) for the number of correction. At a step 49, a real ignition timing SPK$_{real}$ is calculated by a following formula $$SPK_{real} = MAPSTD + K \times \Delta MAPMBT + SPK_{prt} \qquad (1)$$

where $\Delta MAPMBT = MBT - MAPSTD$

The basic ignition timing is applied to an engine 72 (FIG. 2) to operate the engine at the ignition timing. The coefficient K is stored in the RAM 16. If the rough correction is not completed, the coefficient K is updated at the next program so as to roughly converge the ignition timing to a desired ignition timing as described above. It will be understood that if the initial coefficient K is 0, the real ignition timing SPK$_{real}$ calculated by the formula (1) is the maximum ignition timing MAPSTD at the first program. The real ignition timing SPK$_{real}$ obtained by the rough correction is further corrected by the fine correcting operation as described hereinafter with reference to FIG. 2.

The correcting quantity SPK$_{prt}$ for correcting the real ignition timing SPK$_{real}$ and the number of correction NUM are stored in tables 73 and 74. A retard coefficient LN stored in a retard coefficient table 75 and an advance determining period ADJ stored in an advance determining period table 76 are looked up in accordance with the number of correction NUM. The intensity of the knock and the interval of knocks are calculated at a calculating circuit 78 in dependence on a signal from the knock sensor 7, and retarding quantity KNK stored in a retarding quantity table 79 is looked up in accordance with the intensity of the knock. A real retarding quantity RET$_{real}$ is calculated by multiplying th retarding quantity KNK and retard coefficient LN together ($RET_{real} = KNK \times LN$). The correcting quantity SPK$_{prt}$ stored in the table 73 is subtracted with the real retarding quantity RET$_{real}$ to obtain a new correcting quantity SPK$_{prt}$ which is stored in the table 73. The new correcting quantity is added to the basic ignition timing SPK$_{bs}$ to produce a real ignition timing SPK$_{real}$ which is fed to the engine 72.

On the other hand, a comparator 80 is provided for producing a correct signal which is supplied to an advancing quantity setting circuit 81 in accordance with comparison between the interval of the knock and the advance determining period ADJ. If knock does not occur, an advancing quantity ADV of a constant small value obtained in the advancing quantity setting circuit 81 in dependence on the output signal of the comparator 80, is added to the correcting quantity SPK$_{prt}$ to obtain a new correcting quantity SPK$_{prt}$ stored in the table 73.

From the foregoing, it will be understood that the present invention provides a control system where the ignition timing can be corrected in response to the knock by the fine correcting operation, since the rough correction change to the fine correction after a predetermined period of time.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A system for controlling the ignition timing of an internal combustion engine having an ignition timing control device, the system having a knock sensor for sensing engine knock and for producing a knock signal, sensing means for sensing operating conditions of the engine and for producing an engine operating condition signal, a table storing initial ignition timings, rough correcting means responsive to the knock signal and the engine operating condition signal for correcting an initial ignition timing derived from the table with a rough correcting quantity including a coefficient, thereby producing a basic ignition timing, fine correcting means responsive to the knock signal for correcting the basic ignition timing with a fine correcting quantity to produce a real ignition timing when the rough correcting quantity becomes a predetermined value, the system comprising:

first detector means for detecting elapsed time from the start of the rough correcting operation and for producing a first change signal when a predetermined time elapsed during the rough correcting operation;

first means responsive to the first change signal for ending the rough correcting operation and starting the fine correcting operation.

2. The system according to claim 1 further comprising second detector means for detecting the fine correcting quantity and for producing a second change signal when the fine correcting quantity exceeds a predetermined value, and second means responsive to the second change signal for ending the fine correcting operation and for starting the rough correcting operation.

* * * * *